United States Patent [19]
Elvin

[11] 3,728,611
[45] Apr. 17, 1973

[54] TAP CHANGER
[75] Inventor: Sten Elvin, Vasteras, Sweden
[73] Assignee: Allmanna Svenska Elektriska Aktiebolaget, Vasteras, Sweden
[22] Filed: Dec. 23, 1971
[21] Appl. No.: 211,329

[30] Foreign Application Priority Data
   Feb. 5, 1971    Sweden..............................1416/71

[52] U.S. Cl................................................323/43.5 S
[51] Int. Cl................................................G05f 1/20
[58] Field of Search....................323/43.5 S, 22 SC, 323/47

[56] References Cited
UNITED STATES PATENTS 3,619,765  11/1971  Wood..............................323/43.5 S
3,437,913  4/1969  Matzl..............................323/43.5 S Primary Examiner—Gerald Goldberg
Attorney—Jennings Bailey, Jr.

[57] ABSTRACT

A tap changer for switching the load current of a transformer from a first winding output to a second winding output includes two pairs of anti-parallel connected semi-conductor rectifiers with a control device for each pair. A switch arrangement is provided for connecting each of the pairs between any of the outputs and a load current connection. The device includes a control arrangement for controlling and performing the switch between the outputs, which includes a device for transmitting the load current from the rectifier pair connected to one winding output to the pair connected to an adjacent winding output. This transfer is carried out partly by natural commutation except when there is a decrease in the turns of the winding and at the same time a resistive load and partly by means of switching when the load current passes through zero upon a decrease in the turns of the winding and at the same time a resistive load.

1 Claim, 7 Drawing Figures

TAP CHANGER

BACKGROUND OF THE INVENTION

1. Field of the Invention

The present invention relates to a tap changer for switching the load current of a transformer from a first winding output to a second winding output.

2. The Prior Art

It is known that closing and breaking processes in tap changers can be performed by semi-conductor rectifiers, preferably thyristors (IEE conf. 1969 publ. 53, part 1, pages 185 – 192). It is also known that connections between the winding outputs of a transformer can be carried out without overlap when the load current passes through zero (Siemens Zeitschrift, 39 (1965), Volume 4, page 270) and by means of natural commutation (German published specification No. 1,247,479). In both cases it is known to use anti-parallel connected thyristors as connection elements. Two such pairs are necessary per phase. A selector connects them to conducting or current winding outputs, respectively, and there are switching contacts to protect the thyristors and avoid conducting losses. The brief conducting interval means that the transient thermal impedance will be dimensioned for the load current. The voltage between the winding outputs where connection takes place, the step voltage, will be dimensioning. In principle a system entirely without movable parts could be used, but this requires one thyristor pair for each winding output.

When the load current is switched at its passage through zero, the thyristor which is conducting at the departing output when the current passes through zero is allowed to die. After a short rest the control current is passed to the appropriate thyristors. During the pause the thyristors are subjected to the entire transformer voltage $U_t$ which is assumed to be much greater than the step voltage $U_s$. RC circuits protect against over-voltage, that is, take up the temporary load current. When there is a connection towards lower turns of the winding, by which is meant a decrease in the voltage over the power emitting side of the transformer in relation to the power absorbing side of the transformer, the departing thyristor receives the returning transformer and step voltage in the form of reverse blocking voltage. When there is a connection towards higher turns of the winding, by which is meant an increase in the voltage over the power absorbing side of the transformer in relation to the power emitting side of the transformer, the step-voltage returns in the form of off-state voltage. This means that the pause after zero passage is critical with respect to the recovery time of the thyristor and rapid thyristors are necessary. The method can be used for both resistive and inductive loads. In the method using natural commutation, one thyristor is conducting at the departing output. The thyristor having the same conducting direction as that at the output in question has off-state voltage and is ignited. The current commutates over and the departing thyristor receives reverse blocking voltage. Connection towards higher turns of the winding is done while current and voltage are in phase and towards lower turns of the winding when current and voltage are in counterphase. Thus a connection cannot be made towards lower turns of the winding by means of natural commutation if the load is purely resistive.

SUMMARY OF THE INVENTION

The object of the present invention is to effect a method of connection when switching the load current of a transformer from a first to a second winding output which will completely avoid the above drawbacks.

If the load voltage is deformed when it passes through zero, the departing thyristor may be subjected to off-state voltage too early. An expansion of the connection process eliminates this risk at zero current switch-overs. The changer switches the load current of a transformer from a first winding output to a second adjacent winding output and includes two pairs of antiparallel conducted semi-conductor rectifiers with a control device for each pair. A switch arrangement is provided for connecting each of the pairs between any of the outputs and a load current connection. The device includes a control arrangement for controlling and performing the switch between the outputs, which includes a device for transmitting the load current from the rectifier pair connected to one winding output to the pair connected to an adjacent winding output. This transfer is carried out partly by natural commutation except when there is a decrease in the turns of the winding and at the same time a resistive load and partly by means of switching when the load current passes through zero upon a decrease in the turns of the winding and at the same time a resistive load.

BRIEF DESCRIPTION OF THE DRAWINGS

The invention will be more fully described with reference to the accompanying drawings in which.

DESCRIPTION OF THE PREFERRED EMBODIMENTS

Figure 1:
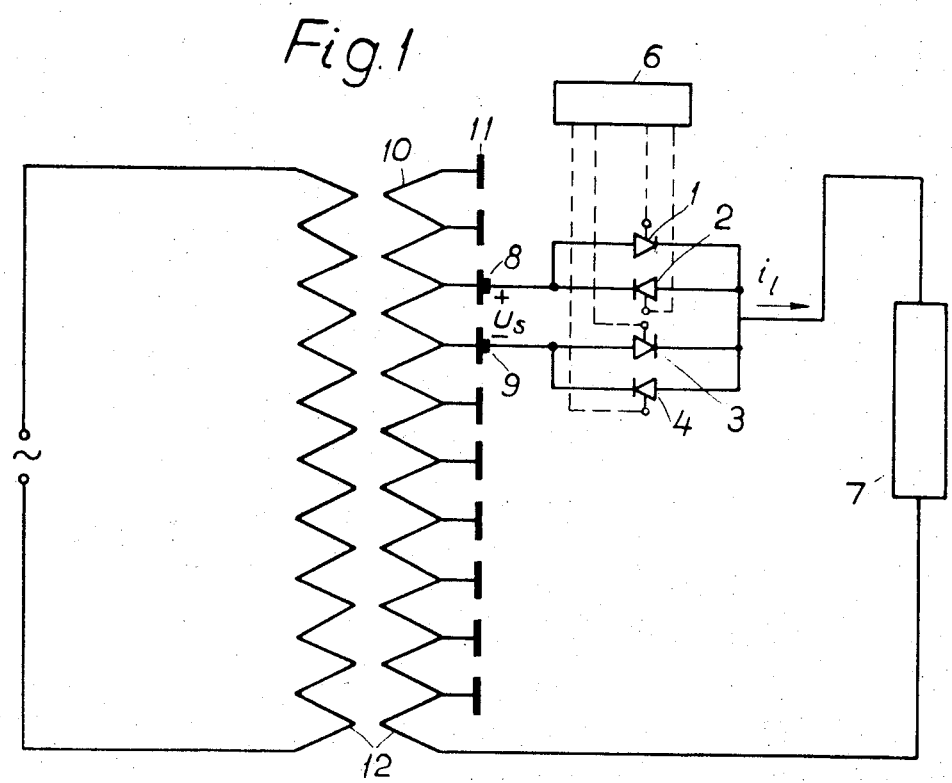
FIG. 1 shows a known embodiment of a tap changer.

The following is a description of the connecting process when using natural commutation and connecting towards higher turns of the winding in connection with FIG. 1.

FIG. 1 shows a tap changer which comprises two antiparallel-connected thyristor pairs 1 and 2, 3 and 4, respectively, with their connections 8, 9 respectively to winding outputs 11 on one winding 10 of a transformer 12. The other connections of the thyristor pair are both connected to a load object 7. A control device 6 is arranged to emit control pulses to the thyristors 1, 2, 3 and 4.

Assume that thyristor 3 is conducting and is connected to the departing output. Thyristor 1, which has the same conducting direction and is connected to the output in use, has off-stage voltage. It then ignites whereupon the current commutates over and the departing thyristor 3 receives reverse blocking voltage. Connection to higher turns of the winding is carried out while current and voltage are in phase and to lower turns of the winding when they are in counterphase. If the load is resistive, connection cannot be carried out by means of commutation to lower turns of the winding. In this case the method is used of switching the load current at its passage through zero which will now be described in connection with FIG. 1.

The conducting thyristor 1 in the first pair of thyristors (the departing pair) is allowed to become extinguished when the load current $i_1$ passes through zero. After a short interval the control current is passed to thyristor 4 in the second pair of thyristors (the present pair). During the interval the entire transformer voltage $U_t$ returns, which is much greater than the step voltage $U_s$. Possibly an RC circuit connected in parallel with the thyristors may take over the load current briefly, to protect against over-voltage. When connecting towards lower turns of the winding, the returning transformer and step voltage is reverse blocking voltage for the departing thyristor 1. This means that only the firing delay determines the length of the interval. When connecting towards higher turns of the winding by means of this method, the transformer voltage will return as reverse blocking voltage whereas the step voltage $U_s$ returns as off-state voltage. This means that the interval is critical with respect to the recovery time of the thyristors. The method is therefore not suitable for connections towards higher turns of the winding since it requires extremely high speed thyristors.

Figure 2:
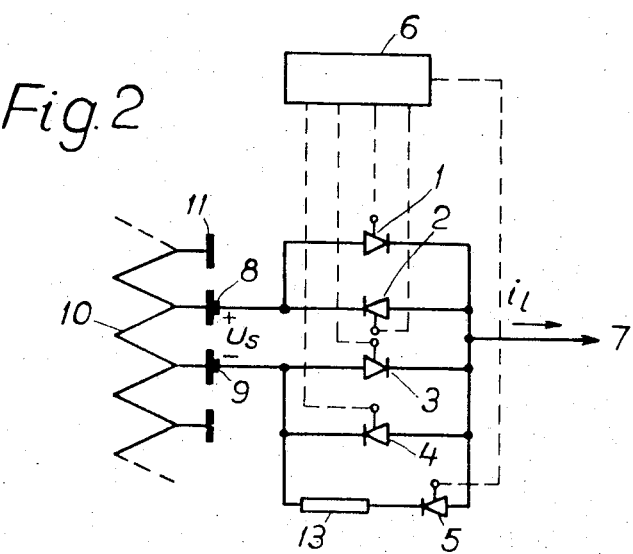
FIG. 2 shows a tap changer with an auxiliary circuit.

If the voltage is deformed at its passage through zero, the departing thyristor can be subjected to off-state voltage too early. This causes no problems when connecting with the method using natural commutation, but otherwise the method illustrated in FIG. 2 can be used in which an auxiliary circuit is used consisting of a resistor 13 in series with a thyristor 5 which is connected in parallel with the present thyristor pair and is used during connection towards lower turns of the winding when there is a purely resistive load.

The connection process is now described. Thyristor 1 is presumed to be conducting. Just before the current passes through zero, the thyristor 5 ignites, whereupon a short-circuiting current $U_s/R$ flows through the resistor 13, R being the resistance of the resistor. The current through the thyristor 1 is then $i_1 + U_s/R$. Just after the current passes through zero the thyristor 4 is ignited, whereupon the auxiliary circuit is short-circuited and the switching is complete. The voltage across the resistor 13 gives a reverse blocking voltage contribution to the thyristor 1 at the same time that the load current $i_1$ is taken over by the thyristor 5 before the thyristor 4 ignites.

Figure 3:
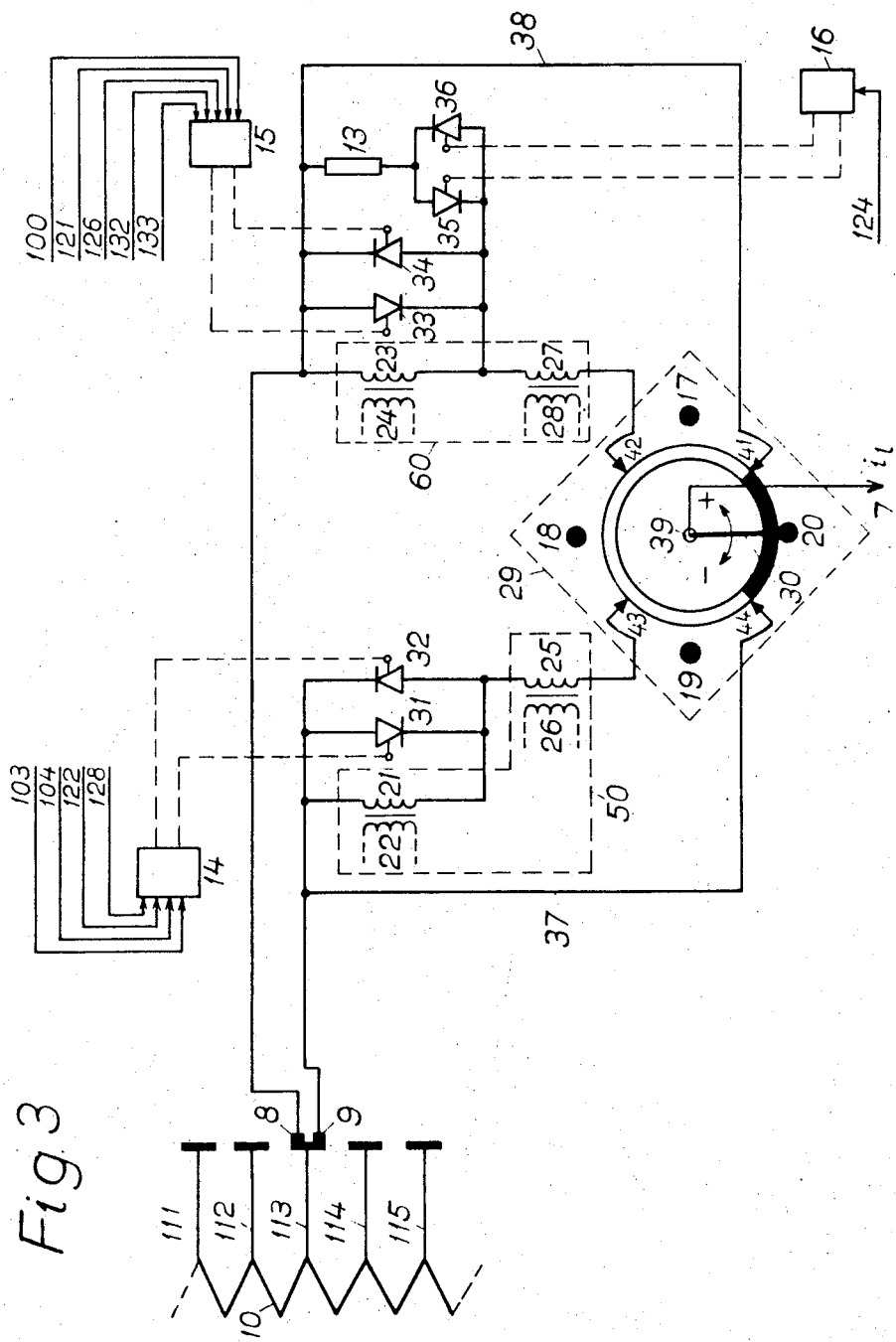
FIG. 3 shows an example of one embodiment of the tap changer and FIGS. 4a to 4d show sensing and controlling means for the device according to FIG. 3.
Figure 4A:
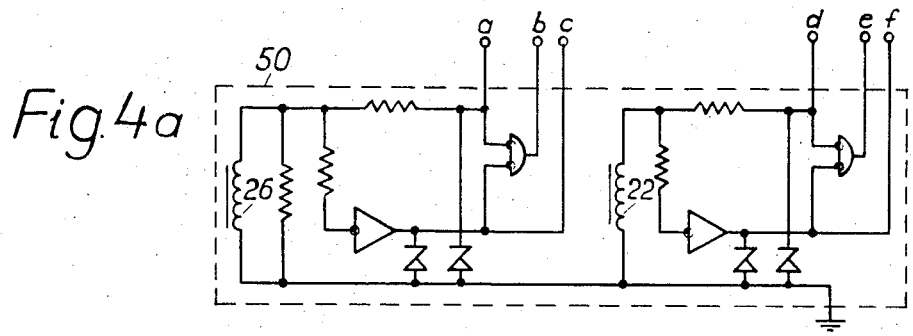

FIG. 3 shows a part of one winding 10 of the transformer 12, with its winding outputs 111 – 115. The connection contacts 8 and 9 of the tap changer are connected to the same winding output 113. The tap changer comprises three pairs of antiparallel-connected thyristor pairs 31 and 32, 33 and 34, 35 and 36, respectively. The thyristor pair 31 and 32 is connected between one connecting contact 9 of the load switch and a switching unit 29 to its contact 43. From the connecting contact 9 there is another connection 37 to the contact 44 of the switching unit 29. Across the thyristor pair 31 and 32 is a sensing means 50, shown in FIG. 4a, connected by way of a winding 21. Between the thyristor pair 31 and 32 and the contact 43, the sensing means 50 is connected by way of a winding 25. The thyristors 31 and 32 are controlled by a control device 14.

Figure 4B:
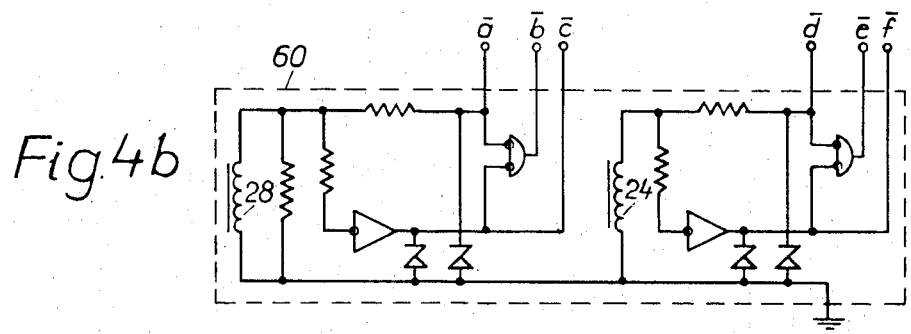
Figure 4C:
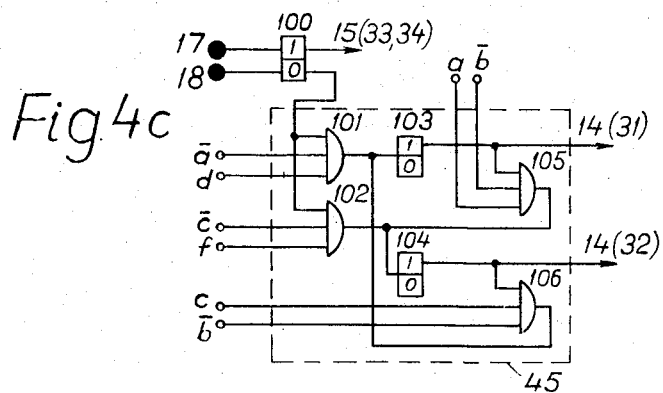
Figure 4D:
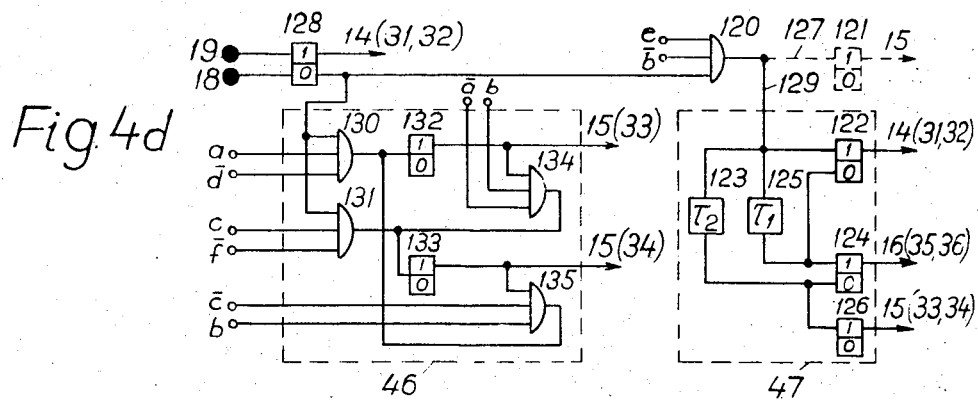

The thyristor pair 33 and 34 is connected between the connecting contact 8 and the contact 42 of the switching unit 29. From the connecting contact 8 there is an additional connection 38 to the contact 41 of the switching unit 29. Across the thyristor pair 33 and 34 a sensing means 60, shown in FIG. 4b, is connected by way of a winding 23. Between the thyristor pair 33 and 34 and the contact 42 the sensing means 60 is connected by way of a winding 27. Across the thyristor pair 33 and 34 is also connected an auxiliary circuit comprising a resistor 13 in series with the antiparallel-connected thyristor pair 35 and 36. The thyristors 33 and 34 are controlled by a control device 15 and the thyristors 35 and 36 are controlled by a control device 16. To the control devices 14, 15 and 16 there are connections from the controlling means 45, 46, 47, which are shown in FIGS. 4c and 4d. The connections a – f and $\bar{a} - \bar{f}$ to the controlling means 45, 46 and 47 comprise the outputs of the sensing means 50 and 60, respectively, shown in FIGS. 4a and 4b respectively. The sensing means 50 and 60 are connected by their windings 22, 26, 24, 28 to the windings 21, 25, 23, and 27, respectively, shown in FIG. 3. The contacts 17, 18, 19, 20 may consist of microswitches operated by the contact 20. The contact 20 is a boss fixed to the movable contact 30 in the switching unit 29 which is connected to the load object 7. The outputs on the sensing members 50 and 60 give the following information:

a — thyristor 31 is in on-state
b — neither of the thyristors 31 or 32 is in on-state
c — thyristor 32 is in on-state
d — thyristor 31 has off-state voltage and thyristor 32 has reverse blocking voltage
e — no voltage over the thyristors 31 and 32
f — thyristor 31 has reverse blocking voltage and thyristor 32 has off-state voltage
$\bar{a}$ — thyristor 33 is in on-state
$\bar{b}$ — neither of the thyristors 33 or 34 is in on-state
$\bar{c}$ — thyristor 34 is in on-state
$\bar{d}$ — thyristor 33 has off-state voltage and thyristor 34 has reverse blocking voltage
$\bar{e}$ — no voltage across the thyristors 33 and 34
$\bar{f}$ — thyristor 33 has reverse blocking voltage and thyristor 34 has off-state voltage.

The following is a detailed description of a tap changer according to the invention in accordance with FIG. 3 with its sensing and controlling means according to FIG. 4, when connected to higher turns of the winding and also to lower turns of the winding with and without an auxiliary circuit.

Connection to Higher Turns of the Winding

The contact 30 is at its starting position in contact with the contacts 41 and 44 according to FIG. 3. The connecting contacts 8 and 9 of the tap changer are connected to the same winding output 113. When connecting to high turns of the winding, the contact 30 is turned round its axis 39 in the positive direction (counter-clockwise). When contact is broken between contact 30 and contact 44, the connecting contact 9 is no longer alive, since the entire load current $i_1$ is flowing through the contacts 41 and 30 to the load object 7. The connection contact 9 can then be moved while currentless to the desired winding output, for example 114. After 90° turning in the positive direction, the contact 30 will be in contact with the contacts 41 and 42. The boss 20 fixed to the contact 30 will thus actuate the microswitch 17. Over the microswitch 17, the flip-flop 100 (FIG. 4c) and the control device 15, the ignition current is obtained to the thyristors 33 and 34. When the contact 30 is turned further in the positive direction, the entire load current will flow through the contacts 42 and 30. When the contact 30 is turned 180° it is in contact with the contacts 42 and 43 and the boss 20 will actuate the microswitch 18. By means of the flip-flop 100, the microswitch 18 blocks the control current to the thyristors 33 and 34. Gate 101 (or 102) will change over when the conditions for this are fulfilled, that is, the control current to the thyristors 33 and 34 is blocked, thyristor 33 (or 34) is in on-state, thyristor 31 (or 32) has off-state voltage and thyristor 32 (or 31) has reverse blocking voltage. Natural commutation can then be performed. The flip-flop 103 (or 104) ignites thyristor 31 (or 32) upon which the commutation is carried out. Switching is then completed by gate 105 (or 106). The contact 30 is then turned back to the starting position in the positive direction, during which time the connecting contact 8 may also be connected in currentless state to the winding output 114.

Connection to Lower Turns of the Winding

The contact 30 is in its starting position according to FIG. 3 and the connecting contacts 8 and 9 are at the same winding output 113. The contact 30 is turned in negative position (clockwise). When the contact between contacts 30 and 41 has been broken, the connecting contact 8 can be moved in currentless state to the desired winding output, for example 112. The load current $i_1$ then flows through the contacts 44 and 30. The contact 30, after being turned 90°, is then in contact with the contacts 44 and 43. The boss 20 activates the microswitch 19. Over the microswitch 19, flip-flop 128 and control device 14, ignition current is obtained to the thyristors 31 and 32. If the load object 7 is not purely resistive, that is if the conditions for change-over of the gate 120 are not completely fulfilled, the switching is performed by natural commutation as is desired in connection with connection towards high turns of the winding by means of gates 130, 131, 134 and 135 and flip-flops 132 and 133. In order for the flip-flop 120 to close, the control pulses to the thyristors 31 and 32 must be blocked, no voltage must prevail over the thyristors 31 and 32 and neither of the thyristors 32 and 34 may be in on-state. If these conditions are fulfilled, there will be common zero passage for the load current $i_1$ and the load voltage $U_1$. The voltage sensed by the sensing member 60 is equal to the step voltage $U_s$. The step voltage $U_s$ is in phase with the transformer voltage $U_t$. This means that we have resistive load since the load current and the transformer voltage, that is, the load voltage, are in phase with each other. When the gate 120 switches, there is an input signal to the controlling means 47 through the connection 129. The thyristor pair 31 and 32 are reignited over the flip-flop 122 and the control device 14. Just before the next zero passage, the thyristors 35 and 36 are given an ignition pulse through the time delay circuit 125, the flip-flop 124 and the control device 16. The time delay $\tau_1$ is slightly less than a half period. At the same time the control current to the thyristors 31 and 32 is blocked by the flip-flop 122. Just after the zero passage, the thyristors 33 and 34 are supplied with ignition current with the help of the time delay circuit 123, the flip-flop 126 and the control device 15. At the same time the control current to the thyristors 35 and 36 is blocked by the flip-flop 124. The time delay $\tau_2$ is longer than a half period. The switchover to winding output 112 is thus complete. If there is not an auxiliary circuit, the changeover at zero passage is carried out by shutting the gate 120, by way of the connection 127 to the flip-flop 121 connected to the control device 15.

The connecting contacts 8 and 9 are movable manually or preferably with means controlled by the position of the contact 30.

By means of the invention a tap changer is obtained which in all situations, regardless of connection towards higher or lower turns of winding and irrespective of the nature of the load, can safely and reliably perform switchings.

I claim:

1. Tap changer for switching the load current ($i_1$) of a transformer (12) from a first winding output (113) to a second winding output (112, 114), comprising a first and second pair of anti-parallel-connected semiconductor rectifiers (31,32 and 33,34), a control device (14,15) for each pair (31,32 and 33,34), means for connecting each of said pairs (31,32 and 33,34) between any of said winding outputs (112,113,114) and a connection for the load current ($i_1$), said tap changer comprising controlling means (45,46) to control and perform the switching from said first winding output (113) to said second winding output (112,114) including means to transfer the load current ($i_1$) from the rectifier pair (31,32 (33,34)) connected to the first winding output (113) to rectifier pair (33,34 (31,32)) connected to the second winding output (112, 114) partly by means of natural commutation except when there is a decrease in the turns of the winding and at the same time a resistive load (7) and partly by means of switching when the load current ($i_1$) passes through zero upon a decrease in the turns of the winding and at the same time a resistive load (7), said tap changer including sensing means (50,60) to sense current and voltage in each pair of anti-parallel-connected semiconductor rectifiers (31, 32 and 33,34), an auxiliary circuit comprising a resistor (13) and an additional pair of anti-parallel-connected semiconductor rectifiers (35,36) in series with said resistor (13) parallel-connected with one of said pairs of semiconductor rectifiers (31,32 or 33,34), a control device (16) connected to the additional pair of rectifiers (35,36) forming part of the auxiliary circuit, a control means (47) including means operable upon switching from the rectifier pair (31,32 (33,34)) not connected to the load current ($i_1$) to the other rectifier pair (33,34 (31,32)) to ignite the rectifier (35 or 36) in the additional rectifier pair (35,36) which has the same conducting direction as the rectifier (31 or 33) (32 or 34) in the rectifier pair (31, 32 (33,34)) to which the auxiliary circuit is parallel-connected, which is arranged to take over the load current ($i_1$).

* * * * *